(12) United States Patent
Grady (10) Patent No.: US 7,630,548 B2
(45) Date of Patent: Dec. 8, 2009

(54) IMAGE SEGMENTATION USING ISOPERIMETRIC TREES

(75) Inventor: Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 681 days.

(21) Appl. No.: 11/230,598

(22) Filed: Sep. 20, 2005

(65) Prior Publication Data

US 2006/0062457 A1    Mar. 23, 2006

Related U.S. Application Data

(60) Provisional application No. 60/612,105, filed on Sep. 22, 2004.

(51) Int. Cl.
    *G06K 9/34* (2006.01)
(52) U.S. Cl. ............... 382/173; 382/171; 382/240
(58) Field of Classification Search .......... 382/171, 382/173, 240; 345/423, 428, 420; 257/E21.495; 370/380; 438/618; 716/2, 18, 6, 5, 7, 1, 716/4, 13, 8
See application file for complete search history.

(56) References Cited

U.S. PATENT DOCUMENTS

| | | | |
|---|---|---|---|
| 6,772,398 B2 * | 8/2004 | Saluja et al. | 716/2 |
| 6,772,399 B2 * | 8/2004 | Saluja et al. | 716/2 |
| 6,798,411 B1 * | 9/2004 | Gorman et al. | 345/428 |
| 6,807,651 B2 * | 10/2004 | Saluja et al. | 716/2 |
| 6,832,357 B2 * | 12/2004 | Saluja et al. | 716/2 |
| 7,209,138 B2 * | 4/2007 | Gorman et al. | 345/423 |

OTHER PUBLICATIONS

Grady L., Schwartz E. L.: "Isoperimetric Graph Partitioning for Data Clustering and Image Segmentati on" Technical Report CAS/CNS-TR-03-0 15, Department of Cognitive and Neural Systems, Boston University, [Online] Jul. 29, 2003, pp. 1-38, XP002378771 Retrieved from the Internet: URL:http:!/eslab.bu.edu/publications/tech- report s/2003/grady2003ani sotropi c-TR.pdf> [retrieved on Apr. 27, 2006] abstract section 1.2 Overview of Graph partitioning p. 4, last paragraph—p. 8, paragraph 1 p. 13, last paragraph—p. 15, line 23 section 3.2 Methods of image egmentation.

(Continued)

*Primary Examiner*—Anh Hong Do
(74) *Attorney, Agent, or Firm*—Donald B. Paschburg; F. Chau & Associates, LLC (57) ABSTRACT

In a method of image segmentation, a tree is derived from input data. A no-fill ordering of a matrix is produced, the matrix representing the tree. A system of linear equations is solved with respect to the matrix, obtaining a solution. The solution is used to define a family of segmentations. A segmentation is selected from the family of segmentations based on a metric of segment quality.

30 Claims, 4 Drawing Sheets

OTHER PUBLICATIONS

Grady L et al: "Faster graph—theoretic image processing via small-world and quadtree topologies" Computer Vision and Pattern Recognition, 2004. CVPR 2004. Proceedings of the 2004 IEEE Computer Society Conference on Washington, DC, USA Jun. 27-Jul. 2, 2004, Piscataway, NJ, USA,IEEE, vol. 2, Jun. 27, 2004, pp. 360-365,XP010708599 ISBN:0-7695-2158-4 Abstract p. 361, left-hand column, last paragraph—right-hand column, line 5 section Iv. Quad tree.

Grady L.: "Fast, Quality, Segmentation of Large Volumes—Isoperimetric Distance Trees" European Conference on Computer Vision 2006,ECCV 2006, [Online] May 7, 2006-May 13, 2006 pp. 1-15, XP002378863 Retrieved fr.om the Internet: URL: http: //cns-web. bu. edu/{1 grady/grady2006fast.pdf> [retrieved on Apr. 28, 2006] the whole document.

* cited by examiner

IMAGE SEGMENTATION USING ISOPERIMETRIC TREES

CROSS-REFERENCE TO RELATED APPLICATION

This application claims the benefit of U.S. Provisional Application Ser. No. 60/612,105, filed Sep. 22, 2004 and entitled "Isoperimetric Trees for Image Segmentation," the content of which is herein incorporated by reference in its entirety.

BACKGROUND OF THE INVENTION

1. Field of the Invention

The present invention relates to image segmentation, and more particularly to methods and systems for image segmentation using isoperimetric trees.

2. Description of the Related Art

Medical imaging is generally recognized as important for diagnosis and patient care with the goal of improving treatment outcomes. In recent years, medical imaging has experienced an explosive growth due to advances in imaging modalities such as x-rays, computed tomography (CT), magnetic resonance imaging (MRI) and ultrasound. These modalities provide noninvasive methods to study internal organs in vivo, but the amount of data is high and when presented as 2D images generally require an anatomist/radiology specialist for interpretation. Unfortunately, the cost incurred in manual interpretation of this data is prohibitive for routine data analysis.

The 2-D slices can be combined to generate a 3-D volumetric model. When the images are taken over time, 4-D (3-D+time) analysis is possible. The accurate and expedient interpretation of this data is difficult to achieve.

Image segmentation plays an important role in computer-based medical applications for diagnosis and analysis of anatomical data by enabling automatic or semi-automatic extraction of an anatomical organ or region of interest from a dataset. For example, image segmentation methods enable the separation of the brain from non-brain tissue, also known as skull-stripping, which is an important and difficult image processing problem in brain mapping research. Image segmentation methods enable the study of the shape and motion of the heart. The study of the mechanics of the heart is important because heart diseases are thought to be strongly correlated to regional changes in the heart's shape and motion.

Methods of graph partitioning in image segmentation that have gained prominence in the computer vision literature include the normalized cuts algorithm, max-flow/min-cut, and the random walker algorithm. Shi, J. and Malik, J., "Normalized cuts and image segmentation," In *IEEE Transactions on Pattern Analysis and Machine Intelligence*, 22(8): 888-905, 2000. Boykov, Y. and Jolly, M.-P., "Interactive graph cuts for optimal boundary & region segmentation of objects in N-D images," In *International Conference on Computer Vision*, volume 1, pages 105-112, July 2001. Yu constructs a multiple level graph encoding cues at different image scales, and optimizes the average Ncut cost across all graph levels. Yu, Stella X., "Segmentation Using Multiscale Cues," In *IEEE Computer Society Conference on Computer Vision and Pattern Recognition*, 1(1): 247-254, 2004.

Grady introduced the isoperimetric graph partitioning algorithm as a method of fully-automatic image segmentation. Grady, Leo, "Space-variant computer vision: A graph-theoretic approach," Ph.D. dissertation, Boston University, Boston, Mass., 2004. However, because the algorithm allows specification of a single node as the foreground point around which the segmentation is based, this point may be chosen by a user, yielding a semi-automatic segmentation algorithm. The isoperimetric algorithm is formulated on a graph where, in the image processing context, each node represents a voxel and edges connect neighboring voxels in a 6-connected lattice.

SUMMARY OF THE INVENTION

According to an exemplary embodiment of the present invention, a method of graph partitioning is provided. The method includes deriving a tree from input data and using the tree as the setting for use of the isoperimetric graph partitioning algorithm.

According to an exemplary embodiment of the present invention, a method is provided for image segmentation. The method includes deriving a tree from input data; producing a no-fill ordering of a matrix, the matrix representing the tree; solving a system of linear equations with respect to the matrix, obtaining a solution; using the solution to define a family of segmentations; and selecting a segmentation from the family of segmentations based on a metric of segment quality.

According to an exemplary embodiment of the present invention, a method is provided for medical image segmentation. The method includes obtaining a mask from a medical image dataset; computing a distance map on the mask; obtaining a foreground point; computing a maximal spanning tree with weights on a neighborhood structure of an image, the weights being a function of the distance map; producing a no-fill ordering of a matrix, the matrix representing the maximal spanning tree; solving a system of linear equations with respect to the matrix, obtaining a solution; using the solution to define a family of segmentations; and selecting a segmentation from the family of segmentations based on a metric of segment quality.

According to an exemplary embodiment of the present invention, a computer readable medium including computer code for image segmentation is provided. The computer readable medium comprises: computer code for deriving a tree from input data; computer code for producing a no-fill ordering of a matrix, the matrix representing the tree; computer code for solving a system of linear equations with respect to the matrix, obtaining a solution; computer code for using the solution to define a family of segmentations; and computer code for selecting a segmentation from the family of segmentations based on a metric of segment quality.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF THE EXEMPLARY EMBODIMENTS

Hereinafter, the exemplary embodiments of the present invention will be described in detail with reference to the accompanying drawings.

Formally, a graph is a pair G=(V,E) with nodes or vertices v∈V and edges e∈E⊆V×V. An edge, e, spanning two vertices $v_i$ and $v_j$, is denoted by $e_{ij}$. A weighted graph has a value (assumed to be nonnegative and real) assigned to each edge called a weight. The weight of edge $e_{ij}$ is denoted by $w(e_{ij})$ or $w_{ij}$ and represents the strength or affinity between neighboring voxels.

Isoperimetric Graph Partioning

The isoperimetric algorithm for graph partitioning can be developed by writing the isoperimetric ratio as $$h_G(x) = \min_x \frac{x^T L x}{x^T r}, \quad \text{[Equation 1]}$$

where r is the vector of all ones, and x represents a vector indicating node membership in a set S⊆V, i.e., $$x_i \begin{cases} 0 & \text{if } v_i \in S \\ 1 & \text{if } v_i \in \bar{S} \end{cases}. \quad \text{[Equation 2]}$$

The n×n matrix L is the Laplacian matrix of the graph, defined as $$L_{v_i v_j} \begin{cases} d_i & \text{if } i = j \\ -w(e_{ij}) & \text{if } e_{ij} \in E \\ 0 & \text{otherwise} \end{cases} \quad \text{[Equation 3]}$$

where $d_i$ denotes the weighted degree of vertex $v_i$;

$$d_i = \sum w(e_{ij}) \forall e_{ij} \in E. \quad \text{[Equation 4]}$$

The notation $L_{v_i v_j}$ is used to indicated that the matrix L is indexed by vertices $v_i$ and $v_j$.

With these definitions, the numerator of the ratio in Equation 1 represents the sum of the weights of the edges spanning S and $\bar{S}$, while the denominator gives the cardinality of S. By relaxing the binary definition of x and minimizing the numerator of Equation 1 with respect to x, given the cardinality constraint $|V| - x^T r = k$, one is left with a singular system of equations. The singularity may be overcome by arbitrarily assigning one node, $v_g$, to S, resulting in the nonsingular system $$L_0 x_0 = r_0, \quad \text{[Equation 5]}$$

where the subscript indicates that the row corresponding to $v_g$ has been removed (or the row and column, in the case of $L_0$.

Given a real-valued solution to Equation 5, one can convert this solution into a partition by finding the threshold that produces a partitioning with minimal isoperimetric constant, with requires trying only n thresholds. In the present context, we are interested in the geometry of the graph (mask), and, therefore, in the solution of Equation 5, we treat $w_{ij}=1$.

Trees

In accordance with exemplary embodiments of the present invention, the standard lattice edge set is replaced with a tree. A zero-fill Gaussian elimination ordering means that the system of linear equations may be solved in two passes, with storage equal to n. Specifically, the ordering may be found in linear time by eliminating the nodes with (unweighted) degree of one (i.e., leaf nodes in the tree) and recursively eliminating nodes which subsequently have degree one until a root node is reached. In this case, a convenient root node is the ground. A method of producing a no-fill ordering of a tree, according to exemplary embodiments of the present invention, is presented below.

| Method of producing a no-fill ordering of a tree |
|---|
| 1: void compute_ordering(degree, tree, ground, ordering) |
| 2: k ⇐ 0 |
| 3: degree[root] ⇐ 0 {Fixed so that ground is not eliminated} |
| 4: ordering[N − 1] ⇐ ground |
| 5: for each node in the graph do |
| 6:    while degree[current_node] equals 1 do |
| 7:        ordering[k] ⇐ current_node |
| 8:        degree[current_node] ⇐ degree[current_node] − 1 |
| 9:        current_node ⇐ tree[current_node] |
| 10:       degree[current_node] ⇐ degree[current_node] − 1 |
| 11:       k ⇐ k + 1 |
| 12:    end while |
| 13:    k ⇐ k + 1 |
| 14: end for |

The above-described method of producing a no-fill order of a tree accomplishes the ordering in linear time, where the array "tree" contains, for each node, the index of one neighbor (with no edges overrepresented). This representation is possible because a tree has n−1 edges (where the root would contain a '0').

Figure 1:
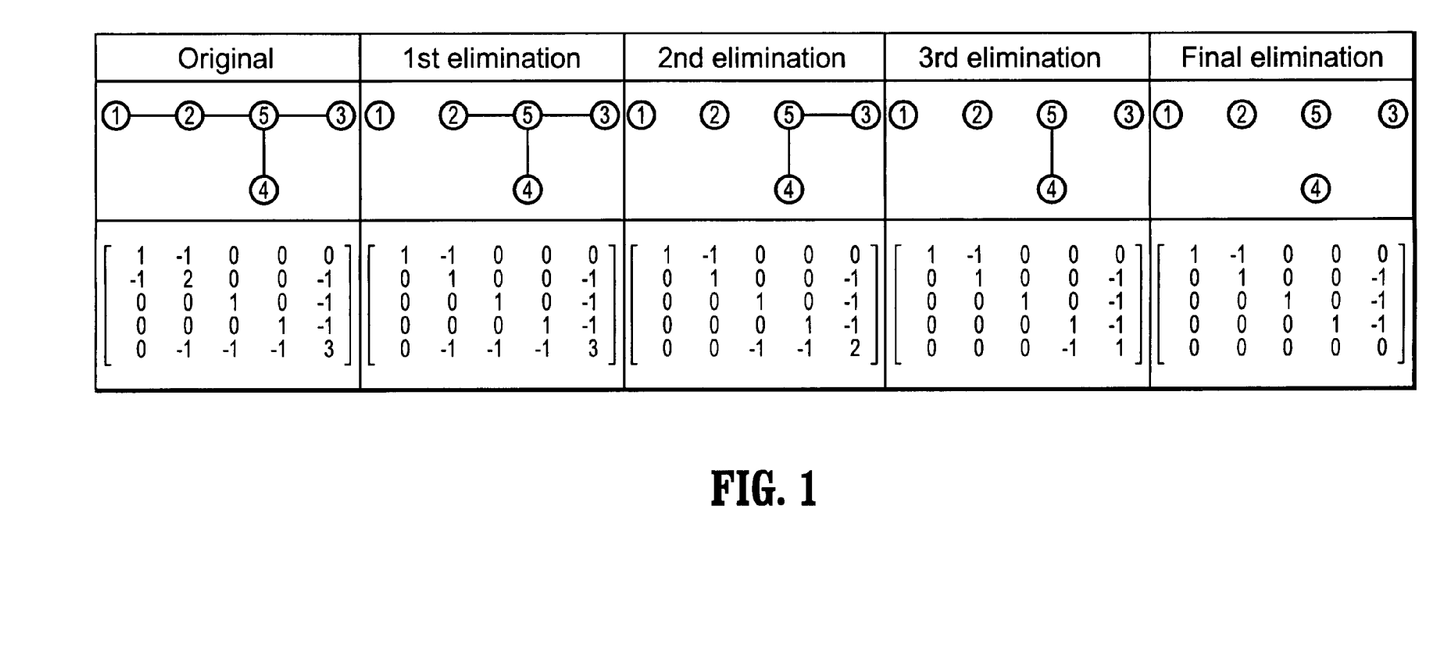
FIG. 1 illustrates a Gaussian elimination of the Laplacian matrix of a tree with ordering given by the numbers inside the nodes, according to an exemplary embodiment of the present invention.

FIG. 1 illustrates a Gaussian elimination of the Laplacian matrix of a tree with ordering given by the numbers inside the nodes, according to an exemplary embodiment of the present invention. Referring to FIG. 1, the top row depicts elimination of the tree, and the bottom row depicts the Laplacian matrix of the tree after each elimination step.

Distance Trees

As described above, by using a tree as the underlying graph structure, i.e., instead of the lattice, a linear-time solution of Equation 5 can be obtained.

A method of solving Equation 5, according to exemplary embodiments of the present invention, is presented below.

| Method of solving Equation 5 |
|---|
| 1: solve_system(ordering, diagonal, tree, r, output) |
| 2: {Forward pass} |
| 3: k ⇐ 0 |
| 4: for each node in the graph do |
| 5:    r[tree[ordering[k]]] ⇐ r[tree[ordering[k]]/diagonal[ordering[k]] |
| 6:    k ⇐ k + 1 |
| 7: end for |
| 8: |

| Method of solving Equation 5 |
| --- |
| 9: output[ordering[N − 1]] ⇐ r[ordering[N − 1]]/diagonal[N − 1] |
| 10: |
| 11: {Backward pass} |
| 12: k ⇐ N − 2 {Last non-ground node} |
| 13: for each non-ground node do |
| 14: output[ordering[k]] ⇐ output[tree[ordering[k]]]+ r[ordering[k]/diagonal[ordering[k]] |
| 15:     k ⇐ k + 1 |
| 16: end for |

The most important property of a tree, such that the solution will examine the desired cut is: The path within the tree between the foreground point and the remaining voxels in the foreground object do not pass through any voxels in the background, i.e., the foreground is connected with the tree. If this condition is satisfied, and the background is also connected within the tree, then the foreground and background are connected with a single edge (i.e., since there can be no loops in a tree).

If the foreground object is connected, gradient ascent on the distance map from each node stabilizes at a node in the same set and the distance map for all neighboring nodes that stabilize to different peaks is largest on the tree foreground/background boundary, then we may construct a tree that satisfies the above desiderata. Assign to each edge in the lattice the weight $$w_{ij}=D(v_i)+D(v_j),$$ [Equation 6]

where $D(v_i)$ denotes the distance map at node $v_i$, and then compute the maximal spanning tree. Hereinafter, the maximal spanning tree of the image with weights given by Equation 6 will be referred to as a "distance tree". It should be understood that functions other than distance are suitable for implementing the present invention. Functions that are suitable for implementing the present invention include, but are not limited to, grayscale, gradient and distance.

Figure 2:
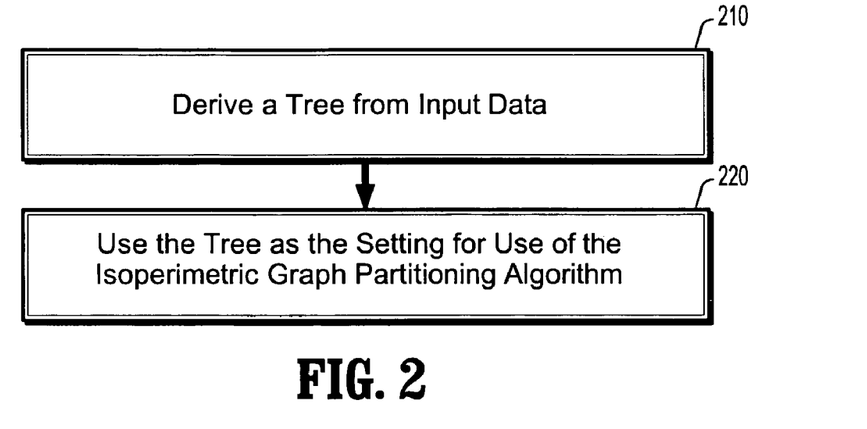
FIG. 2 is a flowchart showing a method of graph partitioning, according to an exemplary embodiment of the present invention.

FIG. 2 is a flowchart showing a method of graph partitioning, according to an exemplary embodiment of the present invention. Referring to FIG. 2, in a step 210, a tree is derived from input data. Preferably the tree is a distance tree. For the purposes of this disclosure, "distance tree" refers to the maximal spanning tree of an image with weights given by Equation 6. Alternatively, the tree is a function tree, wherein the function is a function of interest, the function of interest defining what is important in the data.

In a step 220, the tree is used as the setting for use of the isoperimetric graph partitioning algorithm. In one embodiment of the present invention, the step of using the tree as the setting for use of the isoperimetric graph partitioning algorithm comprises: producing a no-fill ordering of a matrix, the matrix representing the tree; solving a system of linear equations with respect to the matrix, obtaining a solution; using the solution to define a family of segmentations; and selecting a segmentation from the family of segmentations based on a metric of segment quality.

In the method of graph partitioning, according to embodiments of the present invention, the input data comprises either pixels (in the case of a 2D image) or voxels (in the case of a 3D image), and a segmentation is specified by associating the pixels or voxels with either one of a foreground or a background. For example, pixels or voxels with a solution value less than or equal to a threshold are associated with the foreground and pixels or voxels with a solution value greater than the threshold are associated with the background. There are n−1 thresholds, n being the number of pixels.

In the method of graph partitioning, according to at least one embodiment of the present invention, user interaction is not required. Preferably, the metric of segment quality is an isoperimetric ratio, the isoperimetric ratio being defined as the ratio of the perimeter of a node set to the volume of the node set. The volume of the node set is computed based on at least one of the sum of weighted degrees of the nodes in the set or the number of nodes in the set.

Figure 3:
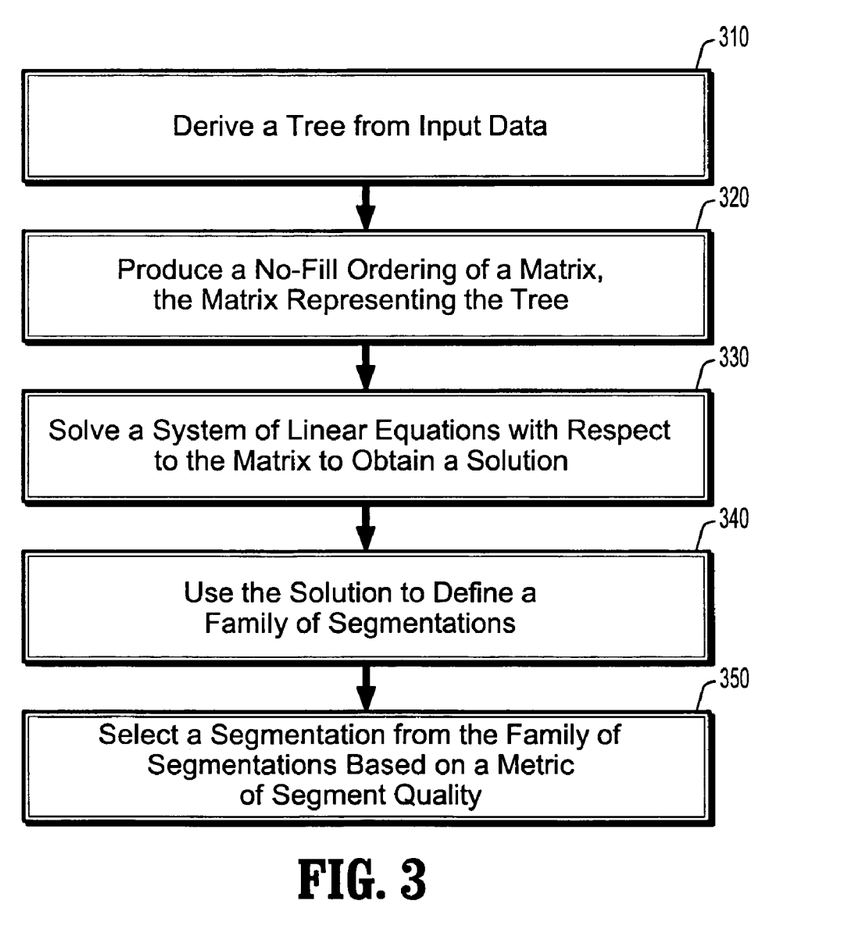
FIG. 3 is a flowchart showing a method of image segmentation, according to an exemplary embodiment of the present invention.

FIG. 3 is a flowchart showing a method of image segmentation, according to an exemplary embodiment of the present invention. Referring to FIG. 3, in a step 310, a tree is derived from input data. Preferably, the tree is a distance tree. Alternatively, the tree is a function tree. The function is a function of interest, the function of interest defining what is important in an image. Functions of interest include, but are not limited to, grayscale, gradient and/or distance. The input data comprises either pixels (in the case of a 2D image) or voxels (in the case of a 3D image). In one embodiment of the present invention, the input data is a mask of pre-selected voxels (e.g., from a thresholding). In one embodiment of the present invention, the step of deriving a tree from input data comprises: obtaining a mask from the input data; computing a distance map on the mask; and computing a distance tree.

In a step 320, a no-fill ordering of a matrix is produced, wherein the matrix represents the tree. In a step 330, a system of linear equations is solved with respect to the matrix, whereby a solution is obtained.

In a step 340, the solution is used to define a family of segmentations. A segmentation is specified by associating the pixels or voxels with either one of a foreground or a background. For example, pixels or voxels with a solution value less than or equal to a threshold are associated with the foreground and pixels or voxels with a solution value greater than the threshold are associated with the background. In general, there are n−1 thresholds, n being the number of pixels.

According to an embodiment of the present invention, in a step 350, a segmentation is selected form the family of segmentations based on a metric of segment quality. Preferably, the metric of segment quality is an isoperimetric ratio, the isoperimetric ratio being defined as the ratio of the perimeter of a node set to the volume of the node set. The volume of the node set is computed based on at least one of the sum of weighted degrees of the nodes in the set or the number of nodes in the set.

A method of image segmentation, according to embodiments of the present invention, further comprises obtaining a foreground point, wherein obtaining a foreground point comprises either one of automatically obtaining a foreground point or interactively obtaining a foreground point. In the method of image segmentation, according to at least one embodiment of the present invention, user interaction is not required.

Figure 4:
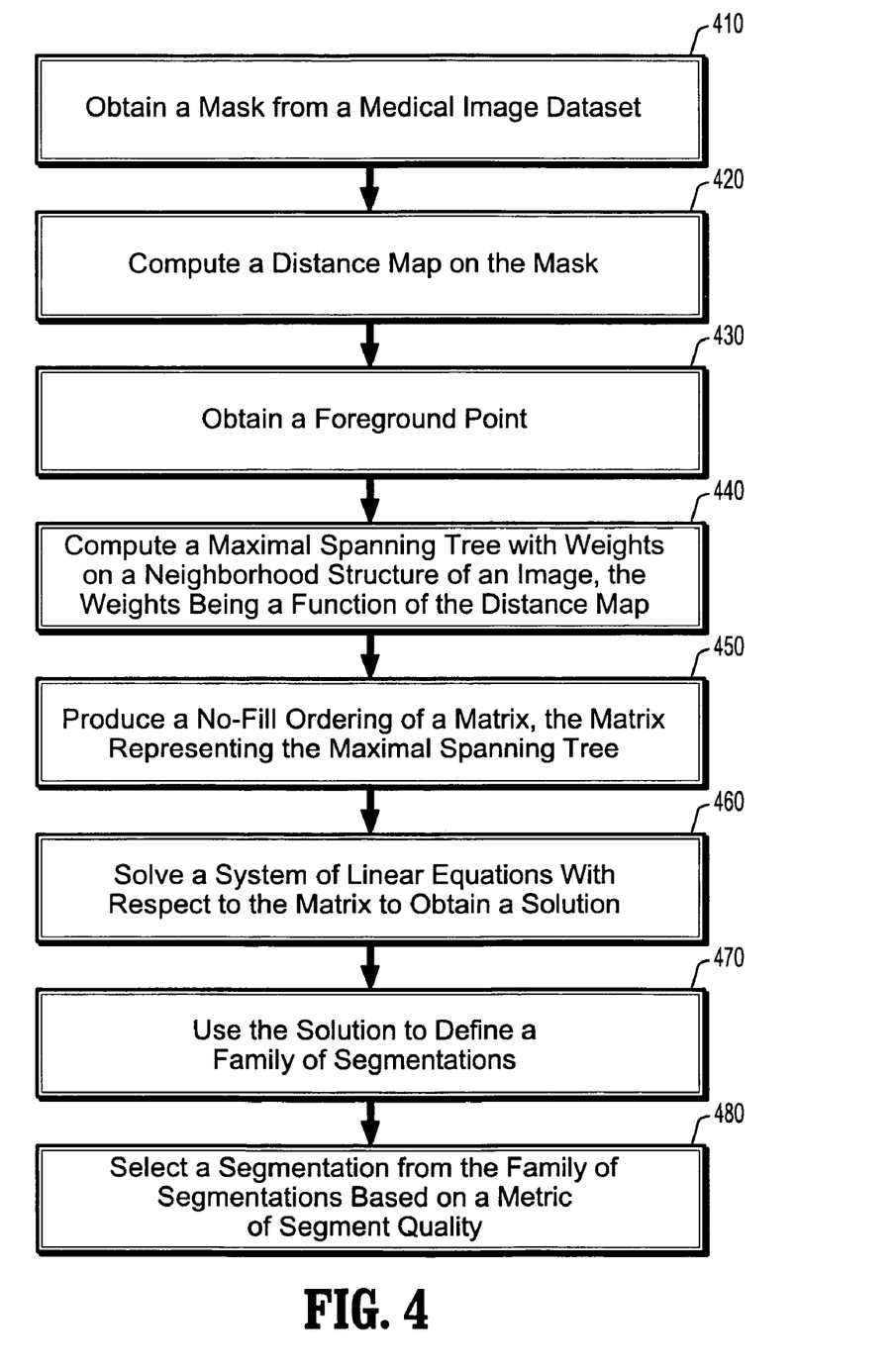
FIG. 4 is a flowchart showing a method of medical image segmentation, according to an exemplary embodiment of the present invention.

FIG. 4 is a flowchart showing a method of medical image segmentation, according to an exemplary embodiment of the present invention. Referring to FIG. 4, in a step 410, a mask is obtained from a medical image dataset. The medical image dataset comprises at least one of 3D medical datasets, 2D medical datasets, or higher-dimensional medical datasets.

In a step 420, a distance map is computed on the mask. In a step 430, a foreground point is obtained. Preferably, the foreground point is a problem-specific foreground point. In one embodiment of the present invention, obtaining the problem-specific foreground point comprises obtaining a user-specified foreground point. In the method of medical image segmentation, according to at least one embodiment of the present invention, user interaction is not required.

In a step 440, a maximal spanning tree with weights is computed on a neighborhood structure of an image, the weights being a function of the distance map. The function of the distance map is given by Equation 6. In at least one embodiment of the present invention, the neighborhood structure is a lattice. The image comprises either pixels (in the case of a 2D image) or voxels (in the case of a 3D image).

In a step 450, a no-fill ordering of a matrix is produced, the matrix representing the maximal spanning tree. In a step 460, a system of linear equations is solved with respect to the matrix, obtaining a solution.

In a step 470, the solution is used to define a family of segmentations. A segmentation is specified by associating the pixels or voxels with either one of a foreground or a background. For example, pixels or voxels with a solution value less than or equal to a threshold are associated with the foreground and pixels or voxels with a solution value greater than the threshold are associated with the background. In general, there are n−1 thresholds, n being the number of pixels.

In a step 480, a segmentation is selected from the family of segmentations based on a metric of segment quality. Preferably, the metric of segment quality is an isoperimetric ratio, the isoperimetric ratio being defined as the ratio of the perimeter of a node set to the volume of the node set. The volume of the node set is computed based on at least one of the sum of weighted degrees of the nodes in the set or the number of nodes in the set.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
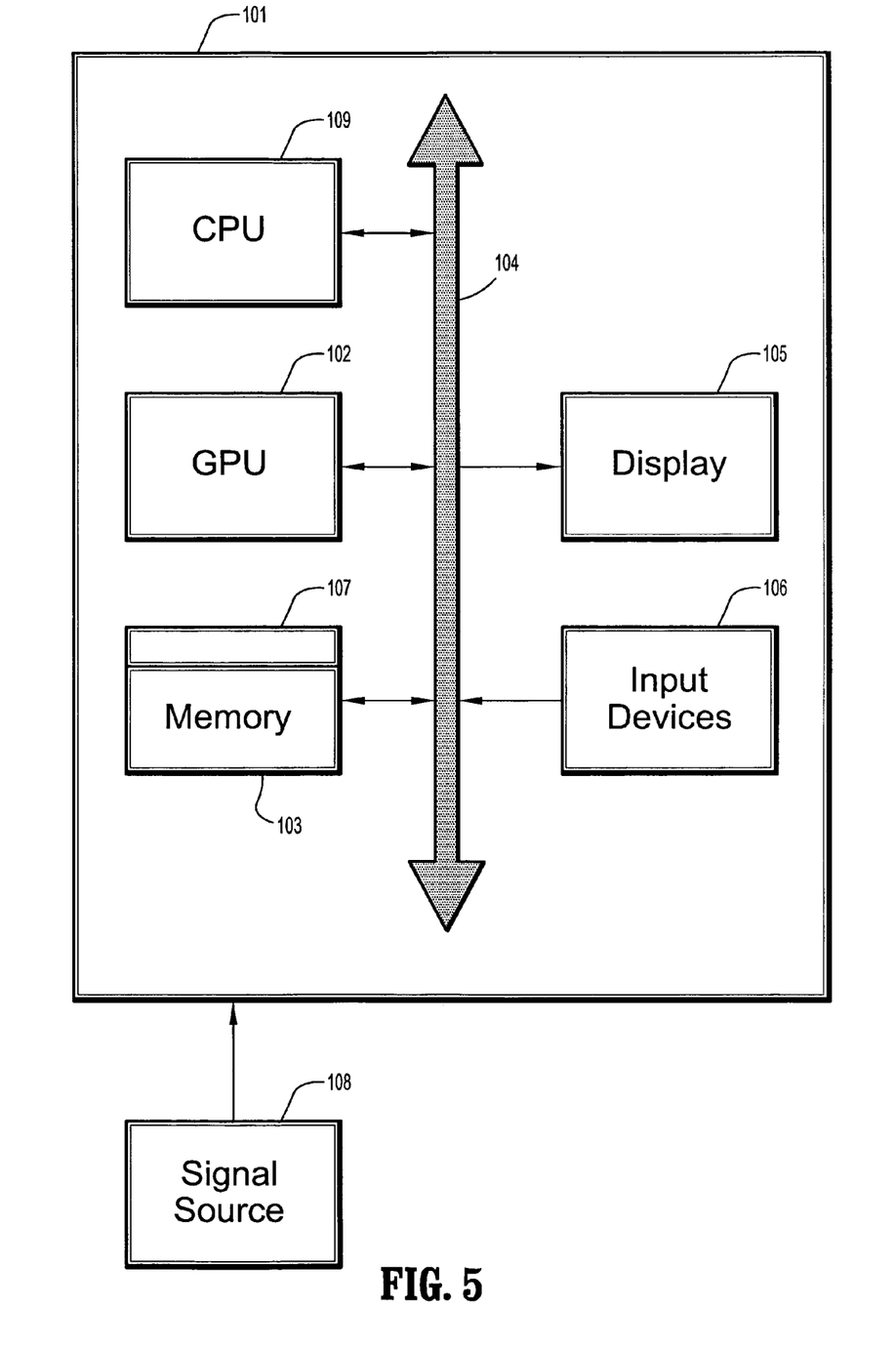
FIG. 5 illustrates a computer system for implementing a method of image segmentation, according to an exemplary embodiment of the present invention.

Referring to FIG. 5, according to an embodiment of the present disclosure, a computer system 101 for implementing a method of image segmentation can comprise, inter alia, a central processing unit (CPU) 109, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 109 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Hereinafter, a computer readable medium including computer code for image segmentation, in accordance with an exemplary embodiment of the present invention will be described. The computer readable medium comprises: computer code for deriving a tree from input data; computer code for producing a no-fill ordering of a matrix, the matrix representing the tree; computer code for solving a system of linear equations with respect to the matrix, obtaining a solution; computer code for using the solution to define a family of segmentations; and computer code for selecting a segmentation from the family of segmentations based on a metric of segment quality.

Preferably, the tree is a distance tree. Alternatively, the tree is a function tree. The function is a function of interest, the function of interest defining what is important in an image. Functions of interest include, but are not limited to, grayscale, gradient and/or distance. The input data comprises either pixels (in the case of a 2D image) or voxels (in the case of a 3D image). In one embodiment of the present invention, the input data is a mask of pre-selected voxels (e.g., from a thresholding). In one embodiment of the present invention, the step of deriving a tree from input data comprises: obtaining a mask from the input data; computing a distance map on the mask; and computing a distance tree.

In exemplary embodiments of the present invention, the metric of segment quality is an isoperimetric ratio, the isoperimetric ratio being defined as the ratio of the perimeter of a node set to the volume of the node set. The volume of the node set is computed based on at least one of the sum of weighted degrees of the nodes in the set or the number of nodes in the set.

A computer readable medium including computer code for image segmentation, according to embodiments of the present invention, further comprises computer code for obtaining a foreground point. For example, computer code for automatically obtaining a foreground point or computer code for interactively obtaining a foreground point.

Although the processes and apparatus of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments may be made without departing from the spirit and scope of the invention as defined by the appended claims.

What is claimed is:

1. A computer readable medium embodying instructions executable by a processor to perform a method of graph partitioning comprising:

deriving a tree from input data; and using the tree as a setting for use of a isoperimetric graph partitioning algorithm, wherein using the tree as the setting for use of the isoperimetric graph partitioning algorithm comprises:

producing a no-fill ordering of a matrix, the matrix representing the tree;

solving a system of linear equations with respect to the matrix, obtaining a solution;

using the solution to define a family of segmentations; and selecting a segmentation from the family of segmentations based on a metric of segment quality.

2. The computer readable medium of claim 1, wherein the tree is a distance tree.

3. The computer readable medium of claim 1, wherein the tree is a function tree.

4. The computer readable medium of claim 3, wherein the function is a function of interest, the function of interest defining what is important in the data.

5. A computer readable medium embodying instructions executable by a processor to perform a method of image segmentation comprising:
   deriving a tree from input data;
   producing a no-fill ordering of a matrix, the matrix representing the tree;
   solving a system of linear equations with respect to the matrix, obtaining a solution;
   using the solution to define a family of segmentations; and
   selecting a segmentation from the family of segmentations based on a metric of segment quality.

6. The computer readable medium of claim 5, wherein the input data comprises either pixels or voxels, and wherein a segmentation is specified by associating the pixels or voxels with either one of a foreground or a background.

7. The computer readable medium of claim 6, wherein pixels with a solution value less than or equal to a threshold are associated with the foreground and pixels with a solution value greater than the threshold are associated with the background.

8. The computer readable medium of claim 7, wherein there are n−1 thresholds, n being the number of pixels.

9. The computer readable medium of claim 5, wherein the metric of segment quality is an isoperimetric ratio, the isoperimetric ratio being defined as the ratio of the perimeter of a node set to the volume of the node set.

10. The computer readable medium of claim 9, wherein the volume of the node set is computed based on at least one of the sum of weighted degrees of the nodes in the set or the number of nodes in the set.

11. The computer readable medium of claim 5, further comprising obtaining a foreground point, wherein obtaining a foreground point comprises either one of automatically obtaining a foreground point or interactively obtaining a foreground point.

12. The computer readable medium of claim 5, wherein the tree is a distance tree.

13. The computer readable medium of claim 5, wherein the tree is a function tree.

14. The computer readable medium of claim 13, wherein the function is a function of interest, the function of interest defining what is important in an image.

15. The computer readable medium of claim 14, wherein the function of interest is at least one of grayscale, gradient, or distance.

16. The computer readable medium of claim 5, wherein the input data is a mask of pre-selected voxels.

17. The computer readable medium of claim 5, wherein deriving a tree from input data comprises:
   obtaining a mask from the input data;
   computing a distance map on the mask; and
   computing a distance tree.

18. The computer readable medium of claim 5, wherein user interaction is not required.

19. A computer readable medium embodying instructions executable by a processor to perform a method of medical image segmentation comprising:
   obtaining a mask from a medical image dataset;
   computing a distance map on the mask;
   obtaining a foreground point;
   computing a maximal spanning tree with weights on a neighborhood structure of an image, the weights being a function of the distance map;
   producing a no-fill ordering of a matrix, the matrix representing the maximal spanning tree;
   solving a system of linear equations with respect to the matrix, obtaining a solution; using the solution to define a family of segmentations; and
   selecting a segmentation from the family of segmentations based on a metric of segment quality.

20. The computer readable medium of claim 19, wherein the image comprises pixels or voxels, and wherein a segmentation is specified by associating pixels or voxels with either one of a foreground or a background.

21. The computer readable medium of claim 20, wherein pixels or voxels with a solution value less than or equal to a threshold are associated with the foreground and pixels or voxels with a solution value greater than the threshold are associated with a background.

22. The computer readable medium of claim 21, wherein there are n−1 thresholds, n being the number of pixels.

23. The computer readable medium of claim 19, wherein the metric of segment quality is an isoperimetric ratio, the isoperimetric ratio being defined as the ratio of the perimeter of a node set to the volume of the node set.

24. The computer readable medium of claim 23 wherein the volume of the node set is computed based on at least one of the sum of weighted degrees of the nodes in the set or the number of nodes in the set.

25. The computer readable medium of claim 19, wherein the medical image dataset comprises at least one of 3D medical datasets, 2D medical datasets, or higher-dimensional medical datasets.

26. The computer readable medium of claim 19, wherein the neighborhood structure is a lattice.

27. The computer readable medium of claim 19, wherein obtaining a foreground point comprises obtaining a problem-specific foreground point.

28. The computer readable medium of claim 27, wherein obtaining the problem-specific foreground point comprises obtaining a user-specified foreground point.

29. The computer readable medium of claim 19, wherein user interaction is not required.

30. A system for performing a method of image segmentation comprising:
   a computer readable medium including computer code for image segmentation
   a processor in communication with the computer readable medium for executing the computer code of the computer readable medium, wherein the system performs the method of image segmentation comprising,
   deriving a tree from input data;
   producing a no-fill ordering of a matrix, the matrix representing the tree;
   solving a system of linear equations with respect to the matrix, obtaining a solution;
   using the solution to define a family of segmentations; and
   selecting a segmentation from the family of segmentations based on a metric of segment quality.

* * * * *

UNITED STATES PATENT AND TRADEMARK OFFICE
CERTIFICATE OF CORRECTION

| | | |
|---|---|---|
| PATENT NO. | : 7,630,548 B2 | Page 1 of 1 |
| APPLICATION NO. | : 11/230598 | |
| DATED | : December 8, 2009 | |
| INVENTOR(S) | : Leo Grady | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Second Day of November, 2010

David J. Kappos
*Director of the United States Patent and Trademark Office*